United States Patent

[11] 3,572,498

[72] Inventor Andrew G. Hammitt
 Palos Verdes Peninsula, Calif.
[21] Appl. No. 761,730
[22] Filed Sept. 23, 1968
[45] Patented Mar. 30, 1971
[73] Assignee TRW Inc.
 Redondo Beach, Calif.

[54] VARIABLE SPEED CONVEYOR
 9 Claims, 11 Drawing Figs.
[52] U.S. Cl. .................................................. 198/182, 198/109
[51] Int. Cl. ...................................................... B65g 15/02
[50] Field of Search ........................................... 198/109, 182

[56] References Cited
 UNITED STATES PATENTS
2,655,250 10/1953 Woolling ..................... 198/182

FOREIGN PATENTS
1,073,437 6/1967 Great Britain ................ 198/182

Primary Examiner—Albert J. Makay
Assistant Examiner—George F. Abraham
Attorneys—Daniel T. Anderson, Donald R. Nyhagen and Jerry A. Dinardo ABSTRACT: A variable speed conveyor having an endless conveyor member composed of longitudinally spaced load-bearing sections which are relatively movable with at least a component of relative motion parallel to the conveyor path. The conveyor member is driven endwise in a manner such that the velocity of each load-bearing section parallel to the conveyor path varies along the path between the conveyor infeed and outfeed stations to maximize the average conveyor velocity along the path and/or to provide the conveyor with different infeed and outfeed velocities. The conveyor is useful both as an article conveyance and a pedestrian conveyance.

Patented March 30, 1971  3,572,498

Andrew G. Hammitt
INVENTOR.

BY
*Donald K. Nylen*
ATTORNEY

Patented March 30, 1971

Andrew G. Hemmitt
INVENTOR.

BY
ATTORNEY

Patented March 30, 1971

Andrew G. Hammitt
INVENTOR.

BY

ATTORNEY

Patented March 30, 1971
3,572,498
6 Sheets-Sheet 4
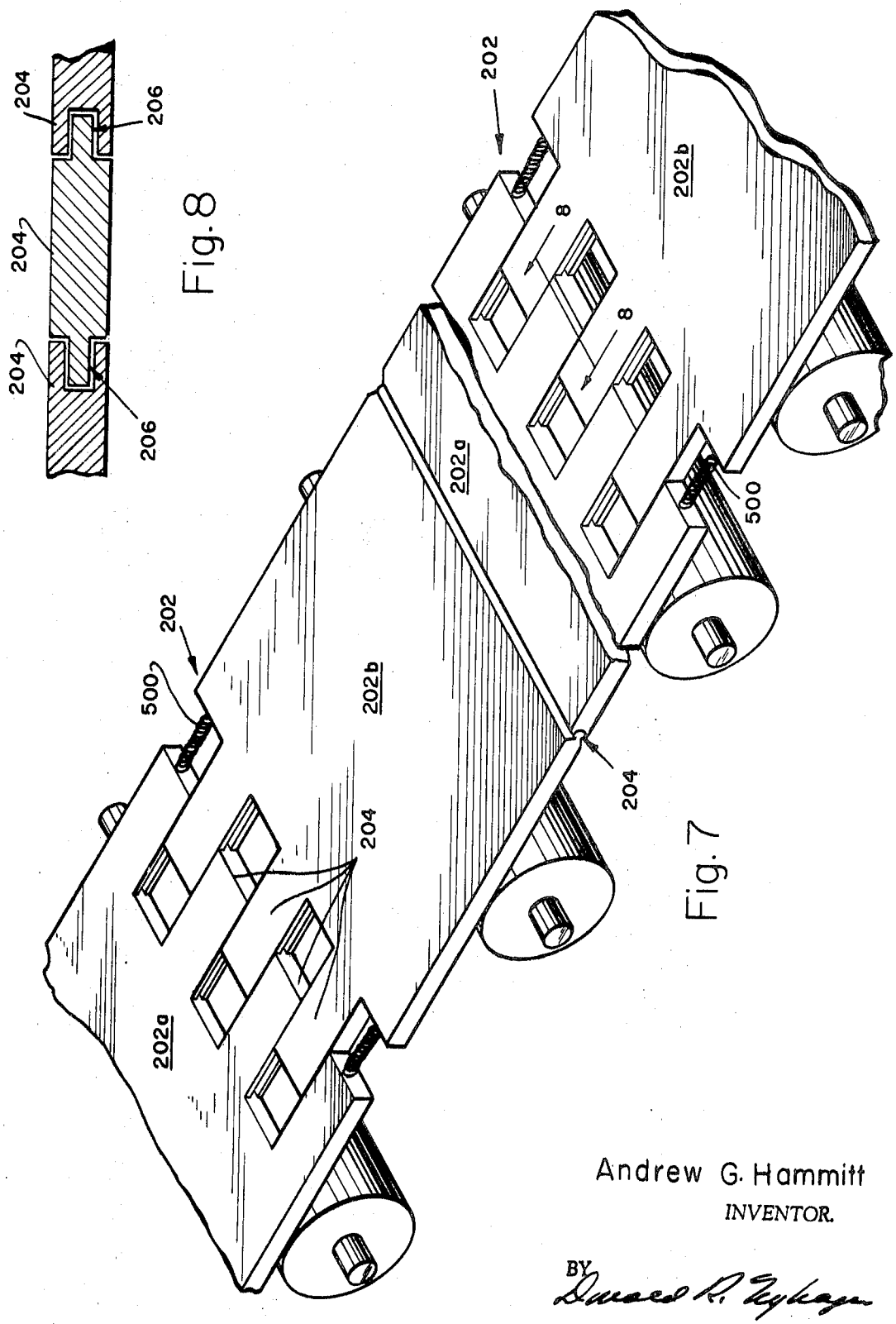
Andrew G. Hammitt
INVENTOR.
BY
ATTORNEY Patented March 30, 1971 3,572,498

Andrew G. Hammitt
INVENTOR.

BY *Donald R. Nyhagen*
ATTORNEY

Patented March 30, 1971

Andrew G. Hammitt
INVENTOR.

BY
ATTORNEY

VARIABLE SPEED CONVEYOR

BACKGROUND OF THE INVENTION

1. Field of the Invention

This invention relates generally to conveyors and more particularly to a novel variable speed endless conveyor.

2. Prior Art

Endless conveyors have long been used as a conveyance for both articles and pedestrians. Some of the existing conveyors of this type are constant-speed conveyors having an endless conveyor member whose velocity remains constant along the entire path of motion of the conveyor. Such conveyors are characterized, then, by equal infeed or entrance, outfeed or exit, and average velocities. As a consequence, the conveyors are limited to those load-handling applications which permit such equal infeed and outfeed velocities and in which the maximum permissible infeed and outfeed velocities provide an acceptable average conveyor velocity. There are, of course, many such applications. Typical conveyors of this type are endless conveyor belts, escalators, and the like.

Many other load-handling handling applications exist, however, in which the above constraint of equal infeed, outfeed, and average conveyor velocities is not acceptable. These other applications may be generally classified as (1) those which require different infeed and outfeed velocities, and (2) those which require an average conveyor velocity exceeding the infeed and outfeed velocities. An exemplary conveyor application of the first class involves transporting loads, i.e., articles or pedestrians, between relatively movable infeed and outfeed platforms, such as from a stationary infeed platform to a moving outfeed platform or vice versa, in such a way as to provide the conveyor member with the same relative infeed and outfeed velocities with respect to the platforms. An exemplary conveyor application of the second class is one, such as a pedestrian conveyance, which is required to have relatively slow infeed and outfeed velocities and a relatively high average velocity.

As will appear from the ensuing description, the present variable speed conveyor may be used to advantage in both of these classes of load-handling applications. However, the conveyor has primary utility as a pedestrian conveyance of the second class and will be disclosed in this connection.

Before proceeding further with the actual disclosure of the present invention, it is well to explore, in somewhat greater detail, the conveyor speed problem as it applies to a pedestrian conveyance. It is well known to those versed in the art that an endless conveyor, to be useful as a practical pedestrian conveyance, must satisfy two basic requirements. First, the conveyor velocity through the infeed and outfeed stations must be sufficiently low to permit passengers to embark on and disembark from the conveyor without such abrupt velocity changes as will present a safety hazard to the passengers or require the passengers to possess more than average agility. Secondly, the overall effective or average conveyor velocity must be sufficiently high to move passengers from one location to another within an acceptable interval of time. In this regard, for example, it should be noted in passing that the maximum safe infeed and outfeed velocities of a pedestrian conveyance of this type, assuming that the passengers embark onto the conveyor from a stationary infeed platform and disembark from the conveyor onto a stationary outfeed platform, are on the order of 2 to 3 m.p.h. Many pedestrian conveyance applications, on the other hand, require an average conveyor velocity on the order of 10 to 15 m.p.h. It is immediately evident that these velocity requirements render conventional constant speed conveyors, such as a simple endless belt, totally unsuitable for such applications. In other words, if the velocity of the conveyor is constant along its entire length, a conveyor which satisfies the infeed and outfeed velocity requirements of such a pedestrian conveyance will not satisfy the average velocity requirement. Conversely, a conveyor which satisfies the average velocity requirement will not satisfy as the infeed and outfeed velocity requirement. It is further evident that the only type of conveyor which will satisfy both requirements is one whose effective velocity progressively increases from the conveyor infeed or entrance station to the midportion of the conveyor path and then progressively decreases from the midportion of the path to the conveyor outfeed or exit station. At this point, it should be noted that while this variable velocity requirement is particularly applicable to pedestrian conveyances, variable speed conveyors may be also used to advantage as article conveyors. It should be further noted that while the invention is primarily concerned with pedestrian conveyances of the class discussed above, that is, pedestrian conveyances have equal entrance and exit velocities, the features of the invention may be utilized to advantage in both of the general classes of variable speed conveyor applications referred to earlier.

Variable speed conveyors have been devised. By way of example, such conveyors are disclosed in U.S. Pat Nos. 1,671,207; 1,689,201; 2,767,522; and 3,292,769. While these existing variable speed conveyors are suitable for certain load-handling applications, they are unsuitable for many other applications, notably pedestrian conveyance.

SUMMARY OF THE INVENTION

The present invention provides an improved variable speed conveyor which is ideally suited for use as a pedestrian conveyance for transporting pedestrians over relatively long distances between stationary infeed and outfeed platforms. As noted above, and as will appear from the later description, however, the present conveyor may be utilized, as well as an article conveyor and for transporting pedestrians or other loads between relatively movable infeed and outfeed means.

The present conveyor has an endless conveyor member with a load-bearing run extending along a prescribed path of motion from an infeed or entrance station to an outfeed or exit station. This conveyor member is characterized, in general terms, by longitudinally spaced load-bearing sections which are relatively movable with at least a component of relative motion parallel to the conveyor path. The conveyor member is driven endwise in such a way that each load-bearing section undergoes acceleration, deceleration, or both acceleration and deceleration, depending upon the particular application of the conveyor, during movement of the respective conveyor section along the load-bearing run between the infeed and outfeed stations. The particular embodiments of the invention which have been selected for presentation in this disclosure, for example, are pedestrian conveyances in which each load-bearing section undergoes initial acceleration during its movement from the entrance station to the midportion of the conveyor path and following deceleration during its movement from the midportion of the path to the exit station. The entrance and exit velocities of the load-bearing sections are made sufficiently low to permit safe transition of passengers from a stationary entrance platform to the conveyor at the entrance station and from the conveyor to a stationary exit platform at the exit station. The rates of acceleration and deceleration of each conveyor section along the conveyor path are adjusted to provide the conveyor with a desired average velocity.

BRIEF DESCRIPTION OF THE DRAWINGS

In the drawings:

FIG. 7 is an enlarged fragmentary perspective view of a further modified variable speed conveyor according to the invention;

FIG. 8 is an enlarged section taken on line 8-8 in FIG. 7;

DESCRIPTION OF THE PREFERRED EMBODIMENTS

Figure 1:
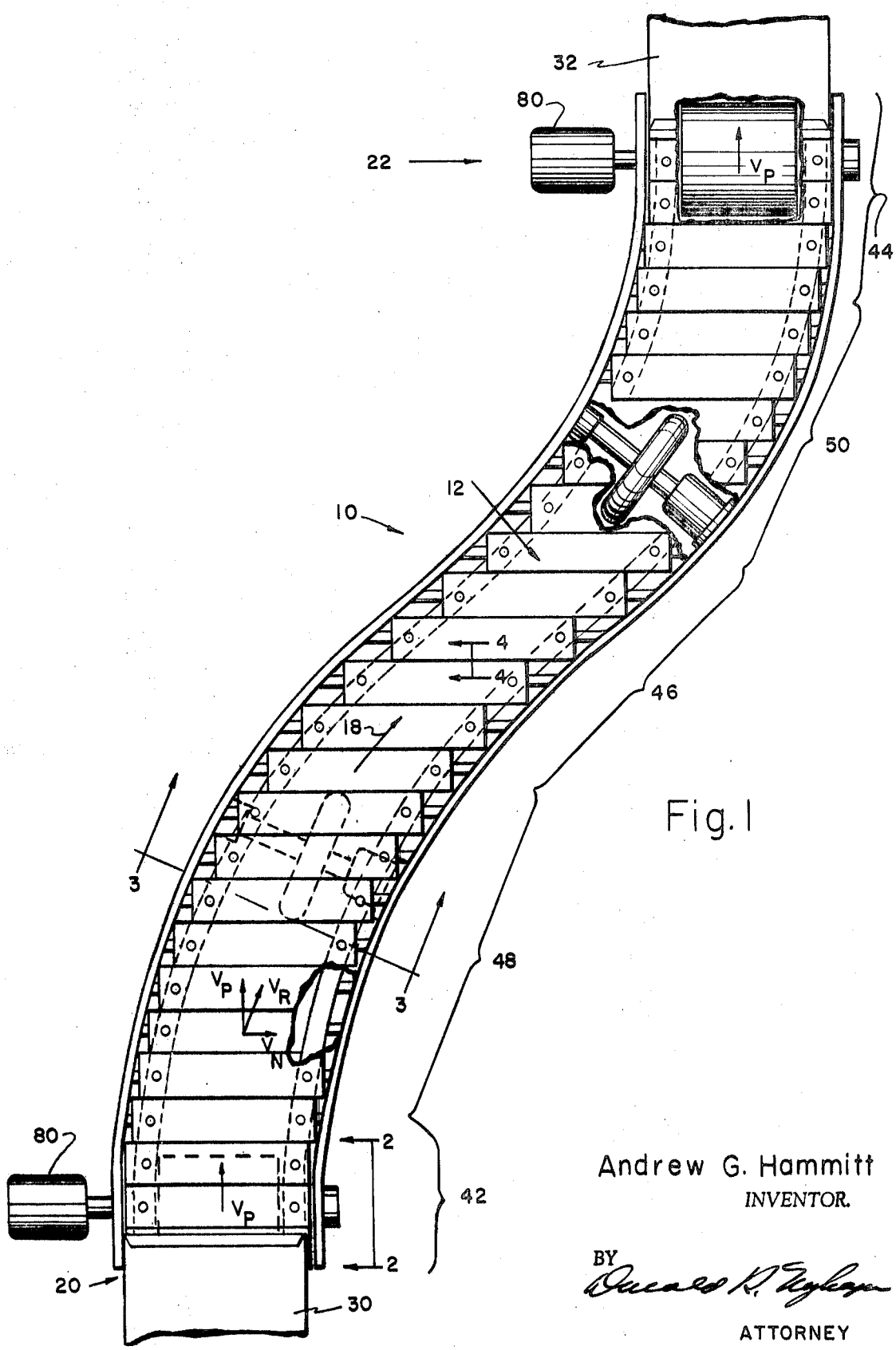
FIG. 1 is a plan view of a variable speed conveyor according to the invention with parts broken away for the sake of clarity.
Figure 2:
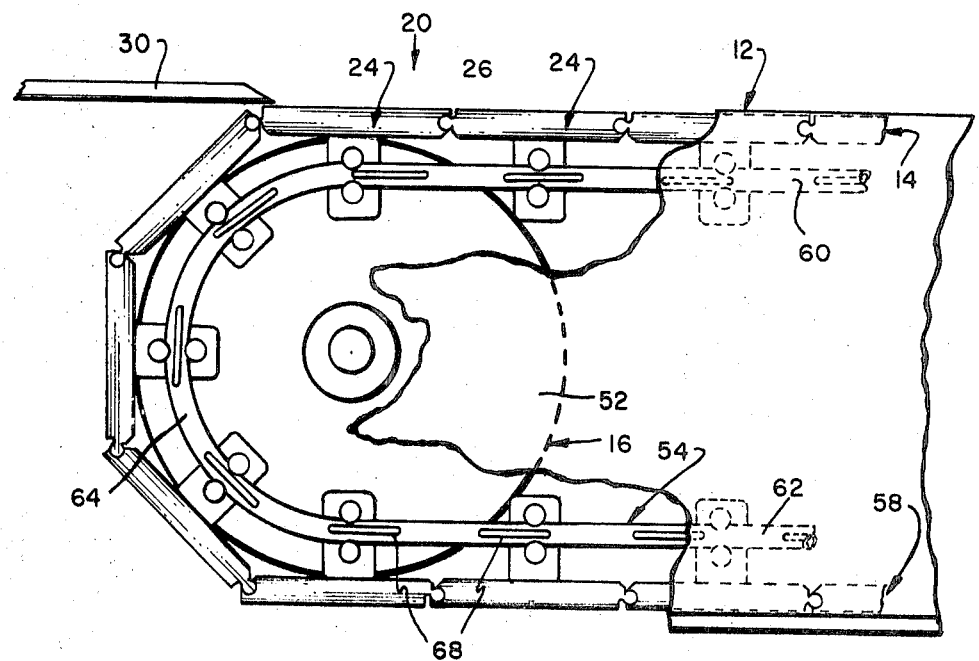
FIG. 2 is an enlarged fragmentary side elevation of the conveyor looking in the direction of the arrows on line 2-2 in FIG. 1.
Figure 3:
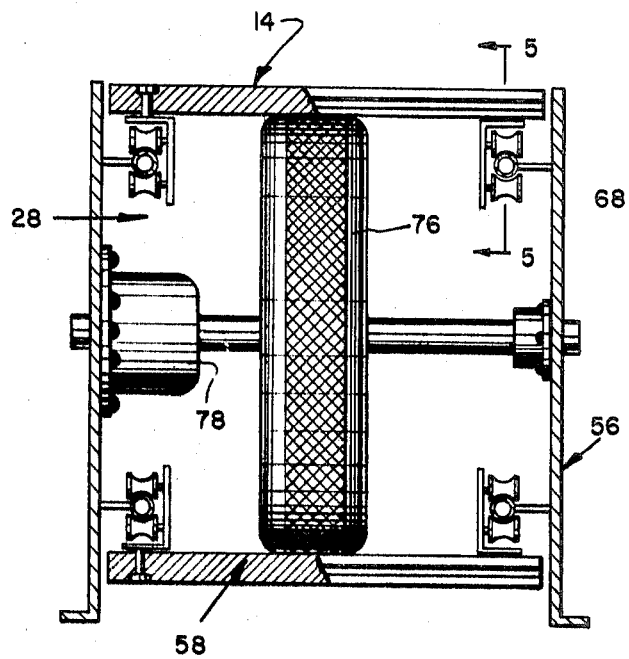
FIG. 3 is an enlarged section taken on line 3-3 in FIG. 1.
Figure 4:
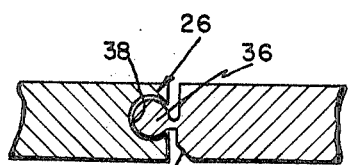
FIG. 4 is an enlarged section taken on line 4-4 in FIG. 1.
Figure 5:
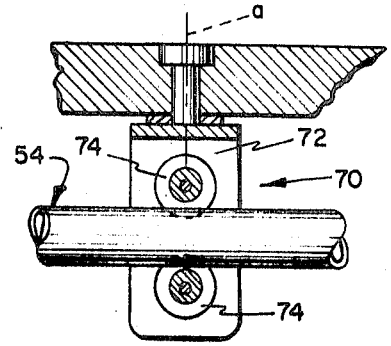
FIG. 5 is an enlarged section taken on line 5-5 in FIG. 3.

Referring to FIGS. 1—5 in general terms, the invention provides a variable speed conveyor 10 having an endless conveyor member 12 with a load-bearing run 14. Conveyor member 12 is supported by means 16 for endwise movement of its load-bearing run 14 along a prescribed path 18 of motion from an infeed station 20 to an outfeed station 22. According to one important feature of the invention, the conveyor member 12 comprises longitudinally spaced load-bearing sections 24 and means 26 joining the adjacent sections for relative movement of the adjacent sections, within the conveyor run 14, with at least a component of relative motion parallel to the conveyor path 18. According to another important feature of the invention, the conveyor member 12 is driven by means 28 in such a way that each load-bearing section 24 within the conveyor run 14 undergoes acceleration, deceleration, or both acceleration and deceleration, depending upon the particular application of the conveyor. The conveyor which has been selected for illustration, for example, is a pedestrian conveyance in which the infeed station 20 is a pedestrian entrance station having a stationary entrance platform 30. The outfeed station 22 is a pedestrian exit station having a stationary exit platform 32. The conveyor is designed to transport pedestrians from the entrance station to the exit stationary at a relatively high average velocity which may be on the order of 10 m.p.h. and in such a way as to provide the load-bearing sections 24 with relatively low infeed and exit velocities relative to the stationary entrance and exit platforms 30, 32 which may be on the order of 2 m.p.h., such that pedestrians may safely embark on and disembark from the conveyor at the entrance and exit stations 20, 22 without the exercise of more than average agility. To this end, the conveyor member 12 is driven in a manner such that each load-bearing section 24 undergoes acceleration from the entrance station 20 to the midportion of the conveyor path 18 and following deceleration from the midportion of the path to the exit station 22. The effective length of the midportion of the conveyor path 18 may be relatively short or relatively long, depending upon the overall length of the conveyor path, the desired average conveyor velocity, the desired or permissible rates of acceleration and deceleration of the load-bearing sections 24, and other factors. In some applications, for example, each load-bearing section may undergo continuous acceleration from its entrance velocity to a preselected maximum velocity throughout one-half of the conveyor path and continuous deceleration from the maximum velocity to its exit velocity throughout the remaining half of the conveyor path. In this case, obviously, the midportion of the conveyor path will have essentially zero length, and each conveyor section will travel at its maximum velocity for only an instant of time. On the other hand, in other applications, each conveyor section 24 may undergo initial acceleration from its entrance velocity to its maximum velocity within a distance less than one-half the overall length of the conveyor path 18, then travel at this maximum velocity for a distance along the conveyor path, and then undergo final deceleration from its maximum velocity to its exit velocity along the remainder of the conveyor path. The midportion of the conveyor path, in this case, is that portion of the path along which each conveyor section travels at its constant maximum velocity and may be of substantial length.

Briefly, during operation of the illustrated conveyor of pedestrian conveyance 10, the conveyor load-bearing sections 24, within the load-bearing run 14 of the conveyor undergo movement in succession along the conveyor path 18 from the entrance station 20 to the exit station 22. Each section passes through the entrance station at a relatively slow entrance speed and is then accelerated at a generally uniform rate from this entrance speed to a preselected maximum speed as the section travels from the entrance station to the midportion of the conveyor path. During final travel of each load-bearing section from the midportion of the conveyor path to the exit station 22, the section is decelerated at a generally uniform rate from its maximum velocity to its relatively slow exit velocity. This acceleration and deceleration of the load-bearing sections 24 causes relative movement or displacement of the sections along the conveyor path 18.

Referring now in greater detail to the embodiment of the invention which has been selected for illustration in FIGS. 1—5, the conveyor load-bearing sections 24 comprise rigid articulated members in the form of plates of rectangular shape arranged edge-to-edge with their longer edges adjacent one another and extending transverse to the direction of movement of the conveyor member 12. The means 26 joining the adjacent plates comprise slide pivot connections which permit each pair of adjacent plates to pivot relative to one another about a pivot axis extending along the adjacent longitudinal plate edges and to slide relative to one another along their pivot axis. A variety of slide pivot connections may be employed for this purpose. The particular slide pivot connections illustrated include a generally cylindrical tongue 36 formed integrally with and extending along one longitudinal edge of each conveyor plate 24 and a generally cylindrical groove 38 formed in and extending along the opposite longitudinal edge of the plate. The tongue 36 on each plate fits rotatably and slidably within the groove 38 on the adjacent plate in such a way that the adjacent plates are restrained against edgewise separation in a transverse direction of the interfitting tongues and grooves but are free to pivot and slide relative to one another in the manner just explained. The longitudinal plate edges are beveled along the undersides of the plates, as indicated at 40, to prevent interference of the adjacent plates during relative pivoting of the plates in the manner explained below.

As noted earlier, the conveyor member 12 is supported by means 16 for endwise movement of its load-bearing run 14 along the conveyor path 18 from the entrance station 20 to the exit station 22. In the particular embodiment of the invention illustrated, the conveyor path 18 conforms to a generally S-shaped curvature and includes generally parallel, laterally displaced, linear terminal portions 42, 44, a linear midportion 46, and intervening arcuate portions 48, 50 of opposite curvature which merge tangentially with the terminal and midportions, as shown. The conveyor supporting means 16 comprise a pair of rotary drums 52 and a pair of rails 54 mounted on a supporting frame 56. One of the drums 52 is located at the conveyor entrance station 20 with its axis normal to the infeed terminal portion 42 of the conveyor path 18. The other drum is located at the conveyor exit station 22 with its axis normal to the outfeed terminal portion 44 of the conveyor path 18. Thus, the drums 52 turn on generally parallel axes and are displaced relative to one another in both their longitudinal and lateral directions. The entrance and exit ends of the conveyor member 12 are trained about the drums, in manner illustrated in FIG. 2, whereby during the operation of the conveyor, the conveyor member travels around the drums as it passes through the entrance and exit stations. The drums are made relatively large in diameter in comparison to the lateral width of the articulated conveyor plates 24 so as to enable these plates to travel smoothly about the drums.

The conveyor guide rails 54 are curved in plan view to conform generally to the conveyor path 18 and are located at opposite sides of the path, in the region between the load-bearing run 14 and the opposite run 58 of the conveyor member 12. In the particular embodiment of the invention illustrated, the load-bearing run 14 is the upper run of the conveyor member and the run 58 is the lower run of the conveyor member. Each rail 54 has a closed loop configuration in side elevation and includes upper and lower generally horizontal rail sections 60, 62 and curved end sections 64 which extend between and join the upper and lower rail sections. These rail end sections straddle the conveyor supporting drums 52 in their endwise direction and are circularly curved about the drum axes, as shown. Each rail 54 is firmly secured to the supporting frame 56, as by means of brackets 68.

Mounted on the undersides of the conveyor-load-bearing plates 24, adjacent the ends of these plates, are guides 70 which ride along and support the plates on the rails 54. In this instance, the conveyor plate guides comprise roller assemblies. The several roller assemblies are identical and each comprises a supporting bracket 72 which is swivelly secured to the respective conveyor plate for turning on a swivel axis $a$ normal to the intersecting the longitudinal centerline of the plate. The roller bracket carries peripherally grooved rollers 74 which engage the top and bottom of the adjacent rail 54, in the manner best shown in FIG. 5, whereby each roller assembly is restrained against relative movement with respect to its supporting rail in all directions except the longitudinal direction of the rail. When the conveyor member 12 is driven endwise in the manner explained below, the conveyor plate roller assemblies 70 ride along the rails 54 and thereby constrain the conveyor plates 42 to follow the conveyor path 18. In this regard, it is significant to observe that the upper and lower sections 60, 62 of the rails generally parallel the conveyor path 18 throughout their length. It is further significant to note that the perpendicular spacing between the rails, that is the rail spacing measured normal to the length of the rails, varies progressively along the rails in such a way that the rail spacing in planes parallel to the pivot axes of the slide pivot connections 26 between adjacent articulated conveyor plates 24, remains constant and equal to the center distance between the swivel axes $a$ of the guide roller assemblies 70 on each plate along the entire length of the rails.

Assume now that the conveyor member 12 is driven endwise in a manner such that the conveyor plates 24 move at constant speed through the entrance and exit stations 20, 22 along the linear entrance and exit portions 42, 44 of the conveyor path 18. Under these conditions, each conveyor plate moves through the entrance station with a single constant velocity component $V_p$ parallel to the entrance portion of the conveyor path. During subsequent movement of each conveyor plate along the initial curved portion 48 of the conveyor path, from the linear entrance portion 42 to the midportion 46 of the path, the plate retains its velocity component $V_p$ and acquires a second velocity component $V_n$ normal to the velocity component $V_p$. The normal velocity component $V_n$ parallels the pivot axes of the slide pivot connections 26 between the conveyor plates and causes relative sliding movement of the adjacent plates along these axes as the plates traverse the initial curved portion 48 of the conveyor path 18. Thus, each conveyor plate 24 moves along the curved path portion 48 with a compound forward and lateral motion having a resultant velocity component $V_r$ along the conveyor path 18 which is the vector sum of the velocity components $V_p$ and $V_n$ of the plate. The parallel velocity component $V_p$ of each conveyor plate remains constant along the entire length of the conveyor path 18. The normal velocity component $V_n$ of each plate, on the other hand, has a magnitude at any given position along the curved portion 48 of the conveyor path 18 which is a function of the angle between the hinge or pivot axes of the plate and the conveyor rails 54 at the given position. This relation is defined by the equation:

$$V_r = \frac{V_p}{\sin \theta}$$

where $\theta$ is the angle between the pivot axes and the rails. Since the angle $\theta$ progressively increases along the curved portion of the path, so does the normal velocity component $V_n$ and the resultant velocity component $V_r$ of each conveyor plate. In other words, the effective or resultant velocity of each conveyor plate 24 along the conveyor path 18 progressively increases, i.e. the plate is accelerated along the conveyor path, as the plate travels along the curved portion 48 of the path from the linear entrance portion 42 to the midportion 46 of the path.

Within the midportion 46 of the conveyor path 18, the angle $\theta$ remains constant. Accordingly, each conveyor plate 24 travels along the midportion of the path with a constant effective or resultant velocity $V_r$ along the path.

As each conveyor plate 24 emerges from the midportion 46 of the conveyor path 18, it enters the final curved portion 50 of the path. Within this latter portion of the conveyor path the angle $\theta$ progressively diminishes to zero as the linear exit portion 44 of the path is approached. Accordingly, each conveyor plate 24 travels along the curved path portion 50 with a compound forward and lateral motion. In this case, however, the lateral component of motion of each plate parallel to its pivot axes occurs in the opposite direction to the lateral motion of the plate which occurs along the initial curved portion 48 of the conveyor path. During its motion along the final curved portion 50 of the conveyor path, therefore, each conveyor plate again has two mutually perpendicular velocity components $V_p$ and $V_n$ whose vector sum $V_r$ represents resultant motion of the plate along the path. Since the pivot axis-rail angle $\theta$ progressively diminishes within the final curved portion of the path, the resultant velocity $V_r$ of each plate also diminishes. Thus, each conveyor plate 24 is decelerated as it travels along the final curved portion of the conveyor path from the midportion 46 to the linear exit portion 44 of the path. Thereafter, the plate travels at its constant velocity $V_p$ along the linear exit portion of the path through the exit station 22.

It will now be understood that when the conveyor member 12 is driven in the manner explained above, each conveyor plate 24 travels through the entrance station 20 at a relatively slow constant entrance speed and is then accelerated from this entrance speed to a predetermined maximum speed as the plate travels from the entrance station to the midportion 46 of the conveyor path. Each plate travels at a constant speed along the midportion of the path and is then decelerated to a relatively slow constant exit speed as the plate travels from the midpath portion to the exit station 22. As noted earlier, the entrance, exit and midpath velocities of the conveyor are selected in accordance with the intended application of the conveyor. The particular conveyor illustrated, for example, is designed for use as a pedestrian conveyance. In this case, the entrance and exit velocities of the conveyor may be on the order of 2 m.p.h. and the midpath or maximum velocity of the conveyor may be on the order of 10 m.p.h. It is significant to recall here that the length of the midportion 46 of the conveyor path 18 and the midpath velocity of the conveyor will be determined by the overall length of the conveyor path, the permissible acceleration and deceleration rates of the conveyor, and the desired overall or average conveyor velocity.

As noted earlier, the conveyor 10 is equipped with means 28 for driving the conveyor member 12 in its endwise movement from the entrance station 20 to the exit station 22. Various drive means may be employed for this purpose, such as motors for driving the conveyor drums 52. The particular drive means illustrated comprise a number of friction drive wheels 76 which are rotatably supported on the conveyor frame 56 between the upper and lower conveyor runs 14, 58 in frictional driving contact with the confronting undersurfaces of the conveyor plates 24. In this regard, it is significant to note that the lower conveyor run 58 follows the same curved path as the upper, load-bearing conveyor run 14. Each drive wheel 76 is oriented with its axis normal to a plane passing through the points tangential driving contact of the wheel with the conveyor plates 24 parallel to the resultant velocity component $V_r$ of the conveyor plates at these points. Each drive wheel is driven by a motor 78 at a rim speed approximately equal to the resultant velocity component of the conveyor plates at their points of driving contact with the respective drive wheel. It is now evident, therefore, that the conveyor drive means 28 are effective to drive the conveyor member 12 endwise in the manner explained earlier. If desired, the driving action of the drive wheels 76 and the drive motors 78 may be aided by utilizing motors 80 for driving the conveyor drums 52.

The conveyor just described presents an advantage, at least in many applications, quite distinct from and in addition to its variable speed advantage explained above. The additional advantage referred to resides in the ability of the conveyor to follow an arcuate path of motion, i.e. turn corners, between the infeed or entrance and outfeed or exit stations.

The arcuate path of the conveyor, of course, is an essential feature of its operation. While this feature is advantageous in many applications, from either or both the standpoints discussed above, that is variable speed operation and corner turning capability. Other applications may require a variable speed conveyor which follows a linear path of motion. FIGS. 6—11 illustrate modified variable speed conveyors according to the invention which possess this capability. The conveyor 100 illustrated in FIG. 6 has an endless conveyor member 102 which, in this instance, is a conveyor belt that is elastic and hence stretchable in its longitudinal direction. The ends of the conveyor belt are trained about supporting drums 104 rotatably supported on a frame 106. Positioned below and spaced longitudinally of the upper load-bearing run 108 of the conveyor belt are a number of drive rollers 110. These drive rollers are rotatably supported on the conveyor frame 106 with their axes of rotation extending normal to the length of the conveyor belt and parallel to the rotation axes of the conveyor belt supporting drums 104. Drive rollers 110 are disposed in positive peripheral driving engagement with the load-bearing run 108. In the particular conveyor illustrated, for example, the drive rollers comprise, essentially, gears having circumferentially spaced teeth 112 which mesh with mating gearlike teeth 114 formed on the undersurface to the conveyor belt 102.

Associated with the drive rollers 110 are means 116 for driving these rollers at different, preselected rim speeds. The illustrated drive means comprise microsyns 118 which are geared to the drive rollers 110. It is now evident, therefore, that at any instant of time, the section of the conveyor belt 102 currently in driving engagement with each drive roller 112 is driven at a linear speed equal to the rim speed of the respective roller. Thus, the conveyor belt effectively undergoes progressive velocity changes as the belt travels along the load-bearing run 108 from the conveyor infeed or entrance station 120 to the conveyor outfeed or exit station 122. Accordingly, the conveyor belt may be driven in such a way that the belt undergoes acceleration, deceleration, or both acceleration and deceleration between the infeed and outfeed stations. The particular conveyor illustrated, for example, is a pedestrian conveyance having an initial acceleration stage adjacent the infeed station 120, and intermediate constant speed stage at the midportion of the conveyor path, and a final deceleration stage adjacent the outfeed station 122. The drive rollers 110 within the acceleration stage are driven at progressively increasing rim speeds in the direction of conveyor belt movement. The drive rollers within the constant speed stage are driven at substantially the same rim speed as the final drive roller of the acceleration stage. Finally, the drive rollers within the deceleration stage are driven at progressively slower rim speeds in the direction of conveyor belt movement, with the roller adjacent the constant speed stage rotating at approximately the same rim speed as the constant speed drive rollers within the latter stage.

From this description, it is evident that the conveyor belt 102 travels through the conveyor entrance station 120 at a relatively slow entrance velocity and is then progressively accelerated during movement of the belt thru the acceleration stage. The conveyor belt then travels at generally uniform velocity through the constant speed stage and thereafter undergoes final deceleration to a relatively slow exit speed at the conveyor exit station 122 during movement through the deceleration stage. The longitudinally successive sections or increments of the conveyor belt 102, then, define, in effect, load-bearing sections which are initially progressively accelerated from the infeed station to the midportion of the conveyor path, then travel at uniform velocity along the midportion of the path, and are finally decelerated from the midportion of the path to the outfeed station. thus, the modified conveyor 100 possesses one of the two major advantages of the first described variable speed conveyor of the invention, to wit relatively slow entrance and exit speeds and a relatively high overall effective or average speed, as required for a pedestrian conveyance. At this point, it will be evident to those versed in the art that the modified conveyor 100 may be driven in either of the other two ways discussed earlier in connection with the first described embodiment of the invention. Thus, the conveyor may be driven in such a way as to effect continuous acceleration or deceleration of the conveyor member 102 from the entrance station to the exit station.

Obviously, this variable speed feature of the modified conveyor 100 presents the same basic requirements as it does in the first described conveyor of the invention, namely relative longitudinal movement or displacement of the conveyor load-bearing sections as these sections undergo acceleration and/or deceleration along the conveyor path. In the particular conveyor under discussion, this requirement is satisfied by the elastic construction of the conveyor belt 102. Thus, the conveyor belt is progressively stretched in the longitudinal direction during its movement from one drive roller to the next within the acceleration stage. The longitudinal stretch in the belt remains constant during its movement through the constant speed stage. Thereafter, during final movement of the belt through the deceleration state, the belt undergoes progressive contraction in the longitudinal direction as it travels from one drive roller to the next. Means 124 are provided along the load-bearing run 108 of the conveyor belt 102 for retaining the latter in driving engagement with the drive rollers 110, thus to prevent disengagement of the belt from the rollers under the action of the longitudinal tension or stretch in the belt, Various means may be employed for this purpose. The particular means illustrated comprise flanges of the frame 106 which overlap the edges of the belt. If desired, the conveyor-belt-supporting drums 104 may also be driven by microsyns 126 to aid the driving action of the drive rollers 110.

FIGS. 7—11 illustrate various alternative endless conveyor members which may be employed in a linear, variable speed conveyor according to the invention. The conveyor member 200 illustrated in FIGS. 7 and 8, for example, comprises articulated, laterally rigid load-bearing sections 202 mutually joined by intervening transverse hinge means 204 for hinging of the adjacent sections about transverse axes of conveyor member during movement of the latter around the conveyor end drums. Each load-bearing section 202 is composed of two coplanar essentially telescoping members in the form of plates 202a, 202b which are free to move relative to one another in the longitudinal direction of the conveyor member but are positively restrained against relative movement in all other directions. In this instance, the two plates 202a, 202b of each load-bearing section 202 are formed with interfitting tongues 204. The adjacent tongues on the two plates are joined by interfitting tongue and groove means 206 which restrain the plates against relative hinging movement from their coplanar relation while permitting the plates to slide relative to one another.

Figure 9:
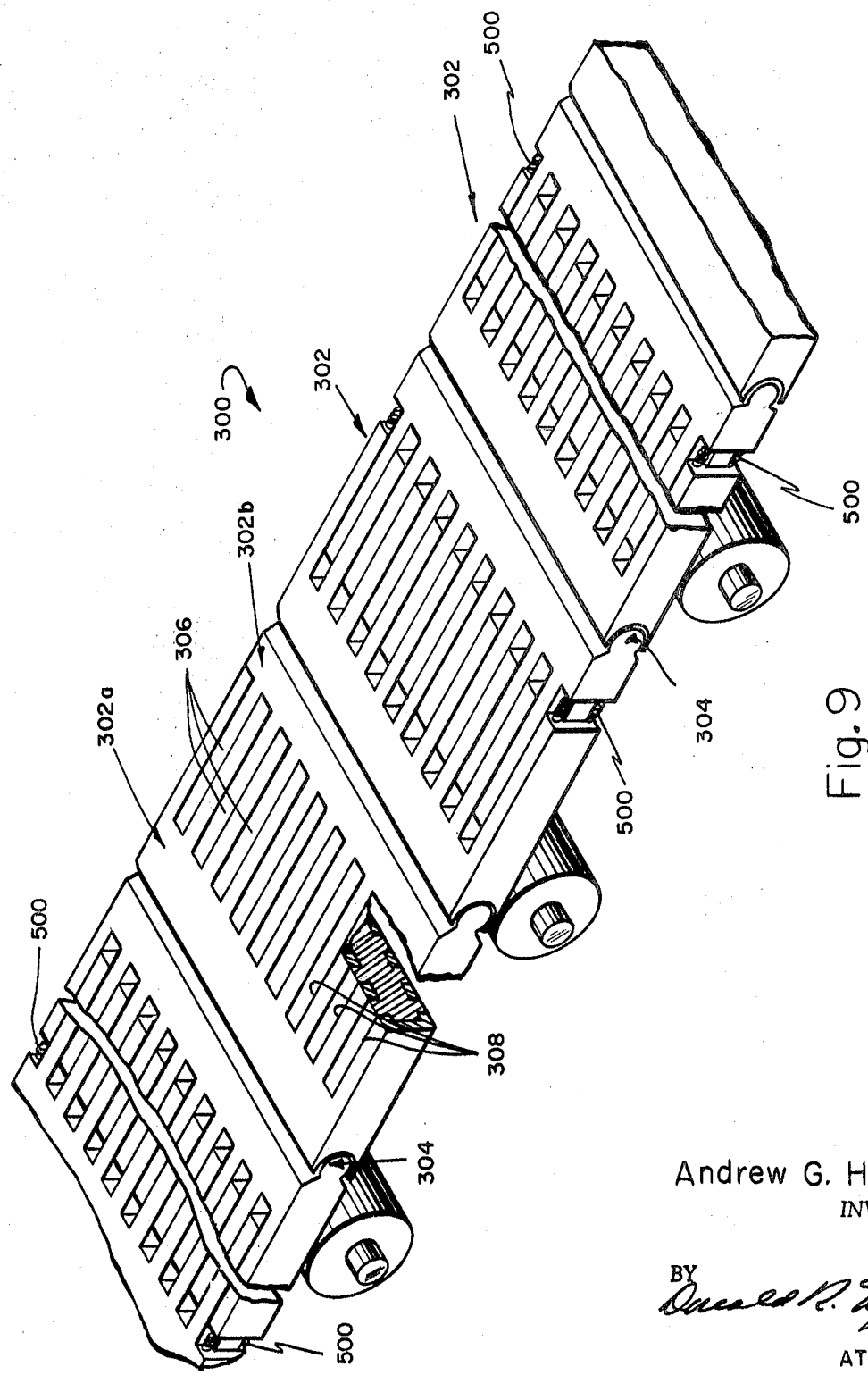
FIG. 9 is a fragmentary perspective view of a further modified variable speed conveyor according to the invention with parts broken away for the sake of clarity.

The modified conveyor member 300 of FIG. 9 is composed of a laterally rigid, longitudinally telescoping load-bearing sections 302 pivotally joined by transverse hinge means 304. Each load-bearing section 302 comprises, in effect, a sleeve member 302a and a plate member 302b which slides in the sleeve. The plate has longitudinal ribs 306 which project through slots 308 in the sleeve walls to provide the sleeve and plate with flush surfaces, as shown.

Figure 10:
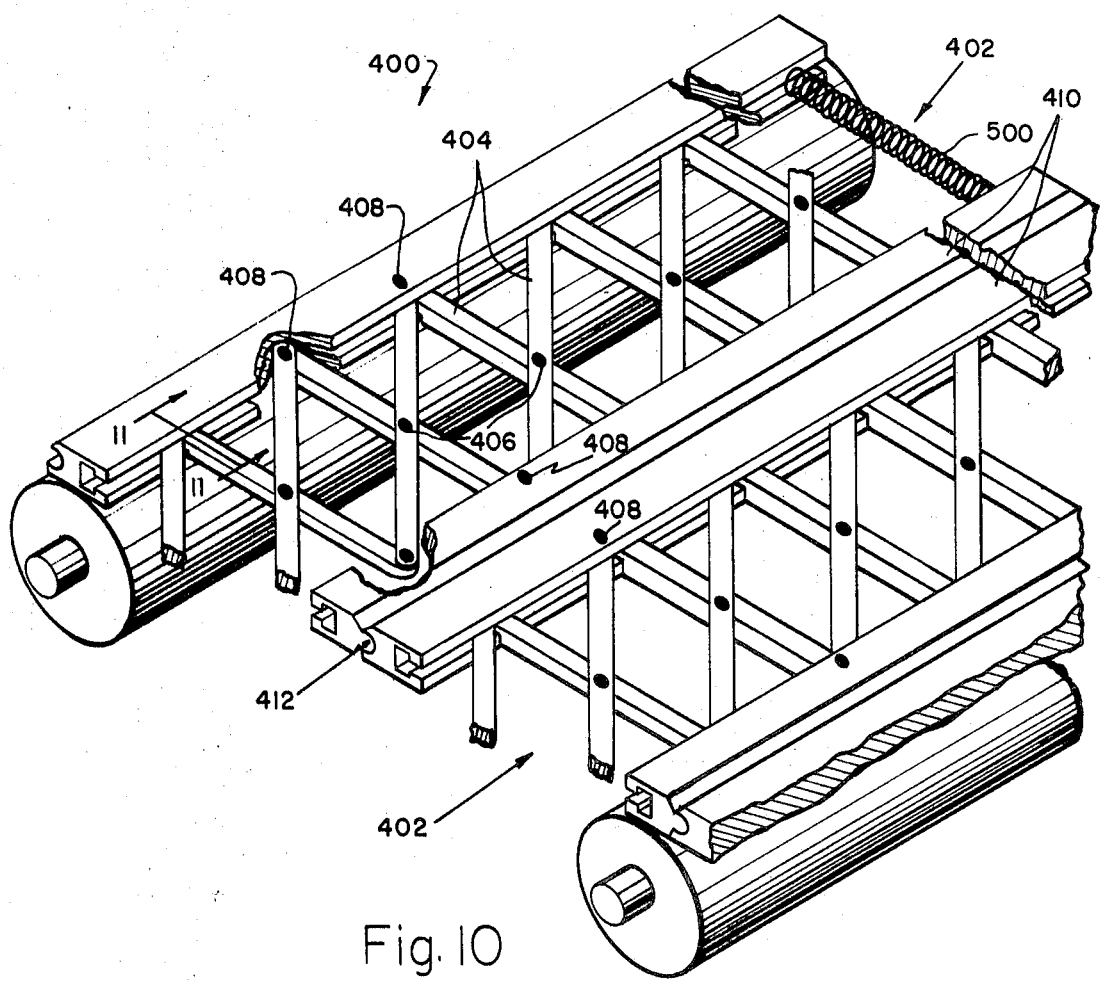
FIG. 10 is a fragmentary perspective view of a further modified variable speed conveyor according to the invention.
Figure 11:
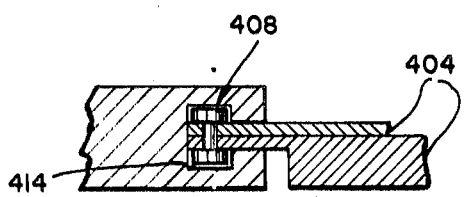
FIG. 11 is an enlarged section taken on line 11-11 in FIG. 10.

Finally, the modified conveyor member 400 of FIGS. 10 and 11 has load-bearing sections 402 each comprising a number of crossed bars 404 which are joined by pivots 406, 408 to form an articulated expansible grating and rigid bars or plate members 410 extending across the conveyor by the ends of the grating. The end plates of adjacent gratings are pivotally joined by hinge means 412. Each grating is secured at its center pivots 408 to the midpoints of the adjacent hinge bars 410. The remaining pivots 408 of each grating are slidably secured to the adjacent hinge bars. These slidable connections may be provided in various ways. In FIGS. 10 and 11, the hinge bars 412 have undercut grooves or guide ways 414, and the remaining pivots 408 of each grating have enlarged headed ends which are slidably captivated in the guideways of the adjacent hinge bars.

Conveyors embodying the modified conveyor members 200, 300, and 400 just described, may be provided with longitudinal guide channels to 300, receive and support the longitudinal edges of the conveyor members. In each case, the conveyor members are driven by microsyn or otherwise powered drive rollers in much the same manner as the conveyor member 102 of load-bearing However, in contrast to the latter conveyor, the drive rollers will drive the modified conveyor members 200, 300, and 400 load-bearing frictional driving contact between the members and rollers. Moreover, each load-bearing section of the modified conveyor members embodies springs 500 which yieldably urge the section to a contracted condition in the longitudinal direction of the respective conveyor member.

Figure 6:
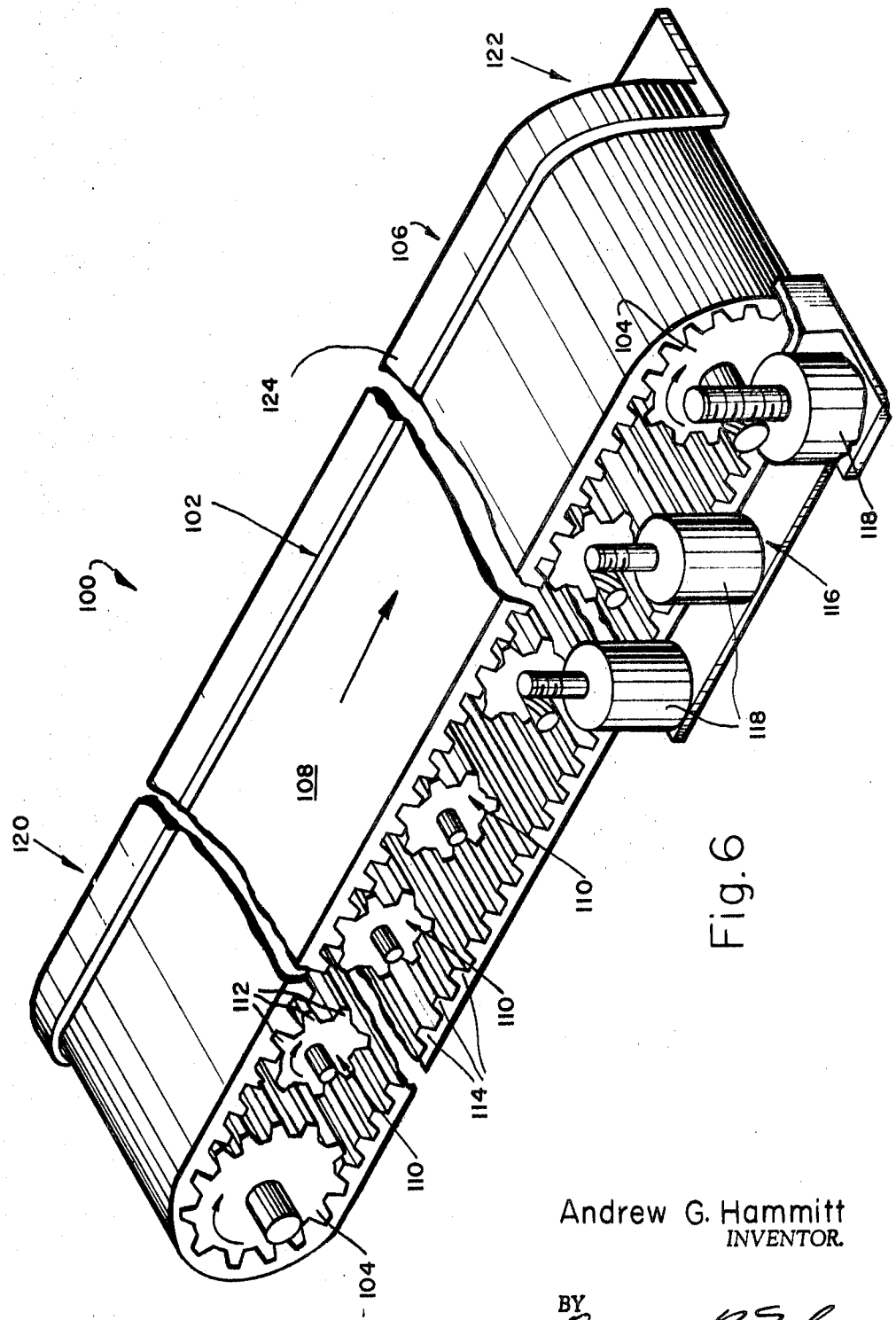
FIG. 6 is an enlarged perspective view of a modified variable speed conveyor according to the invention with parts broken away for the sake of clarity.

It will be obvious that a present variable speed conveyor utilizing any one of the modified conveyor members 200, 300, and 400 will operate in essentially the same manner as the conveyor 100 of FIG. 6. In the case of a conveyor with the modified conveyor members 200, 300, however, longitudinal extension and contraction of the load-bearing sections which is required to accommodate the described variable speed operation of the conveyor involves relative longitudinal sliding or telescoping movement of the load-bearing plates 202a, 202b, in FIG. 7 and the load-bearing sleeves 302a and plates 302b in FIG. 9. In the case of the modified conveyor member 400 of FIGS. 10 and 11, extension and contraction of the conveyor load-bearing sections involves extension and contraction of the articulated load-bearing gratings. These gratings, of course, extend laterally of the conveyor member as they contract lengthwise of the member and, conversely, contract laterally as they extend longitudinally.

At this point, those versed in the art will note a significant difference between the first two and the last three described embodiments of the invention. Thus, in the first two embodiments, a single means serves the dual function of connecting the adjacent load-bearing sections for movement along a curved path of motion around the end supporting drums of the conveyor, and accommodating extension and contraction of the load-bearing sections as a consequence of the velocity changes experienced by the sections as they travel along the conveyor path. In the embodiment of FIGS. 1—5 for example, the slide pivot connections 26 serve this dual function, while in the embodiment of FIG. 6, the elastic conveyor belt itself serves this dual function. The inventive embodiments illustrated in FIGS. 7—11, on the other hand, require hinge means between the adjacent conveyor sections to accommodate movement of the conveyor member around the conveyor end drums and separate means for accommodating longitudinal extension and contraction of the load-bearing sections occasioned by the velocity changes which these sections undergo along the conveyor path.

While the invention has been disclosed in what is presently conceived to be its preferred and most practical embodiments, it should be understood that various modifications of the invention are possible within the spirit and scope of the following claims.

I claim:

1. A variable speed conveyor comprising:
   an endless conveyor member including a number of relatively rigid generally rectangular plates disposed in longitudinal edge-to-edge relation along said conveyor member, and slide pivot means joining the adjacent plates along the adjacent edges thereof for relative hinging rotation of the adjacent plates about parallel hinge axes extending along said adjacent plate edges transversely of the said conveyor member and relative edgewise sliding movement of the adjacent plates along the intervening hinge axes, said slide pivot means acting to positively restrain the adjacent plates against all relative movement other than said relative hinging rotation about and said relative edgewise sliding movement along said hinge axes, whereby said hinge axes remain parallel along the entire path of said conveyor member;
   said conveyor member having a load-bearing run extending along a prescribed path of motion between an infeed station and an outfeed station;
   said conveyor path having an arcuate portion along which each said conveyor plate travels with a first component of motion normal to its hinge axes and a second component of motion parallel to its hinge axes, whereby each conveyor plate has a resultant velocity component parallel to said conveyor path; and
   means for driving said conveyor member in its endwise direction.

2. A conveyor according to claim 1, wherein:
   said conveyor driving means drives said conveyor member endwise in such a way as to provide each said conveyor plate with a generally constant first velocity component normal to its hinge axes; and
   the curvature of said arcuate path portion varies therealong, whereby the resultant velocity component of each conveyor plate varies along said arcuate path portion.

3. A conveyor according to claim 1, wherein:
   said conveyor path has a linear portion extending generally normal to said conveyor plate hinge axes and merging tangentially with said arcuate path portion; and
   said conveyor driving means drives said conveyor member with a constant velocity normal to said hinge axes, whereby the velocity of each conveyor plate parallel to said conveyor path remains generally constant along said linear path portion and varies during movement of the respective plate between said path portions.

4. A conveyor according to claim 3, wherein said linear path portion preceeds said arcuate path portion in the direction of movement of said conveyor member, whereby each conveyor plate undergoes acceleration along said conveyor path during movement from said linear path portion to said arcuate path portion.

5. A conveyor according to claim 3, wherein said linear path portion follows said arcuate path portion in the direction of movement of said conveyor member, whereby each conveyor plate undergoes deceleration during movement from said arcuate path portion to said linear path portion.

6. A conveyor according to claim 1 wherein:
   said conveyor path has parallel linear portions extending through said infeed and outfeed station respectively, normal to said hinge axes; and
   said arcuate path portion has a generally S-shaped curvature and merges tangentially with said linear path portions, respectively, whereby each conveyor plate travels through said infeed and outfeed stations with a generally constant velocity parallel to said conveyor path and undergoes initial acceleration and final deceleration during movement along said arcuate path portion.

7. A conveyor according to claim 6, wherein said conveyor driving means comprise driving rollers spaced along said conveyor path and disposed for successive tangential driving contact with said conveyor plates, and means for driving each roller at a rim velocity equal to the velocity of each conveyor plate parallel to said path at the position of driving contact of the respective plate and roller.

8. A conveyor according to claim 1, wherein:

said supporting means comprise rails extending along and generally parallel to said conveyor path, and guides on the ends of said conveyor plates respectively, engaging and movable along said rails; and the spacing between said rails in plane parallel to said hinge axes remaining constant along the entire length of said rails.

9. An endless conveyor member comprising:

a number of relatively rigid load-bearing plates arranged in longitudinally spaced edge-to-edge relation to form an endless conveyor member;

slide pivot means joining the adjacent edges of the adjacent plates for relative hinging rotation of the adjacent plates about parallel hinge axes extending transversely of said conveyor member and relative edgewise sliding movement of the adjacent plates along the intervening hinge axes; and said slide pivot means acting to positively restrain the adjacent plates against all relative movement other than said relative hinging rotation about and said relative edgewise sliding movement along said hinge axes, whereby said hinge axes remain parallel along the entire path of said conveyor member.

UNITED STATES PATENT OFFICE
CERTIFICATE OF CORRECTION

Patent No. 3,572,498      Dated March 30, 1971

Inventor(s) Andrew G. Hammitt

It is certified that error appears in the above-identified patent and that said Letters Patent are hereby corrected as shown below:

| | |
|---|---|
| Col. 5, line 18 | delete "the" in the first instance and substitute -- and --. |
| Col. 8, line 10 | change "thus" to read -- Thus --. |
| Col. 9, line 20 | delete "300," and insert -- slidably --; |
| line 24 | delete "load-bearing" and insert -- FIG. 6. --; |
| line 26 | delete "load-bearing" and insert -- by simply --. |
| Col. 11, line 5 | delete "plane" and insert -- planes --. |

Signed and sealed this 24th day of April 1973.

(SEAL)
Attest:

EDWARD M. FLETCHER, JR.
Attesting Officer

ROBERT GOTTSCHALK
Commissioner of Patents